(12) United States Patent
Tanaka et al.

(10) Patent No.: US 6,515,064 B1
(45) Date of Patent: Feb. 4, 2003

(54) MOLDED ELASTOMER

(75) Inventors: Hiroyuki Tanaka, Settus (JP);
Masanori Hasegawa, Settsu (JP);
Tsuyoshi Noguchi, Settsu (JP);
Katsuhiko Higashino, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/889,009

(22) PCT Filed: Jan. 11, 2000

(86) PCT No.: PCT/JP00/00054

§ 371 (c)(1),
(2), (4) Date: Jul. 6, 2001

(87) PCT Pub. No.: WO00/42093

PCT Pub. Date: Jul. 20, 2000

(30) Foreign Application Priority Data

Jan. 12, 1999 (JP) ............................. 11-005753

(51) Int. Cl.$^7$ .................................................. C08K 3/04
(52) U.S. Cl. ...................... 524/496; 524/588; 524/544; 524/545; 524/546; 525/387; 525/375
(58) Field of Search ................. 524/588, 544, 524/545, 546, 496, 387, 375

(56) References Cited

U.S. PATENT DOCUMENTS

| | | |
|---|---|---|
| 4,472,336 A | 9/1984 | Enoki et al. |
| 4,772,522 A | 9/1988 | Kubota et al. |
| 4,776,935 A | 10/1988 | Goshima et al. |
| 5,986,012 A | * 11/1999 | Legare et al. |

FOREIGN PATENT DOCUMENTS

| | | |
|---|---|---|
| EP | 1 097 948 A1 | 5/2001 |
| EP | 1 106 268 A1 | 6/2001 |
| EP | 1 160 275 A1 | 12/2001 |
| JP | 60-88073 | 5/1985 |
| JP | 7-292198 | 11/1995 |
| JP | 8-259733 | 10/1996 |
| JP | 10-87889 | 4/1998 |
| WO | WO 95/02634 A1 | 1/1995 |
| WO | WO 00/04083 A1 | 1/2000 |

OTHER PUBLICATIONS

International Search Report for PCT/JP00/00054 dated Feb. 22, 2000.
Supplementary European Search Report for EP 00 90 0154, dated Feb. 13, 2002.

* cited by examiner

Primary Examiner—Robert Dawson
Assistant Examiner—Kuo-Liang Peng
(74) Attorney, Agent, or Firm—Sughrue Mion, PLLC

(57) ABSTRACT

To provide an elastomer molded article for a semiconductor manufacturing equipment which not only has cleanliness required but also has an excellent plasma resistance and an excellent property of metal-elution inhibition. The elastomer molded article is obtained by crosslinking a crosslinkable elastomer composition comprising a crosslinkable elastomer component and a carbon black filler having an average particle size of not more than 700 μm and an impurity metal content measured by an ashing analysis method of not more than 300 ppm and has an impurity metal content measured by an ashing analysis method of not more than 100 ppm. An increasing rate of particles generated by irradiating oxygen plasma to the article is not more than 500% or an amount of impurity metals extracted from the article with a 50% aqueous solution of HF is not more than 500 ppb.

27 Claims, No Drawings

MOLDED ELASTOMER

TECHNICAL FIELD

The present invention relates to a clean molded article which has an excellent plasma resistance and an excellent property of inhibiting elution of metals, has a reduced content of impurity metals and can give a sealing member to be used for sealing of a semiconductor manufacturing equipment.

BACKGROUND ART

In manufacturing semiconductor elements, very high cleanliness is required, and the requirements for high cleanliness range over not only management of a production process of semiconductors but also a semiconductor manufacturing equipment itself and parts of such equipment. Even if the parts of semiconductor manufacturing equipment are cleaned after built in the equipment, a degree of possible cleanliness is limited. Such parts are required to have been cleaned highly before built in the equipment. Contamination which becomes a problem particularly in the production of semiconductors is caused by fine particles, organic compounds and elution of metals which have an adverse effect on accurate etching treatment.

Also high cleanliness is required similarly in a molded article such as a sealing member for semiconductor manufacturing equipment which the present invention can be particularly suitably applied to. The present applicants have attained high cleanliness of the sealing member itself by employing a special method of cleaning the sealing member after molding (WO99/49997).

Such a sealing member is produced by crosslinking a crosslinkable elastomer composition such as a rubber, and in order to provide the sealing member with mechanical properties, there is a case where a carbon black is added as a filler to the composition.

In production of semiconductors, there is a case where a dry process such as plasma etching is carried out. In that dry process, there is a case where particles (impurity fine particles) are generated from molded parts produced from an elastomer. Those contaminating sources must be eliminated.

Also with respect to the sealing member used in a wet process such as cleaning process, it is desired to reduce elution of metals more.

The present invention relates to a molded article which has an excellent plasma resistance and an excellent property of metal-elution inhibition and can be obtained by crosslinking a crosslinkable elastomer composition containing a carbon black which has a reduced content of impurity metals and causes no crosslinking failure even if not only radiation crosslinking but also crosslinking with a peroxide crosslinking agent is carried out.

DISCLOSURE OF INVENTION

Namely the present invention relates to an elastomer molded article which is obtained by crosslinking a crosslinkable elastomer composition comprising a crosslinkable elastomer component and a carbon black filler having an average particle size of not more than 700 μm and an impurity metal content measured by an ashing analysis method of not more than 300 ppm. The elastomer molded article has an impurity metal content measured by an ashing analysis method of not more than 100 ppm and (1) an increasing rate of particles generated by irradiating oxygen plasma to the article is not more than 500% or (2) an amount of impurity metals extracted from the article with a 50% aqueous solution of HF is not more than 500 ppb.

In case where the molded article is used in a dry process, it is particularly preferable to use a graphitized carbon black filler. It is desirable that an average particle size of such a graphitized carbon black filler is from 10 to 100 μm, preferably from 10 to 30 μm from the viewpoint of inhibiting generation of particles after plasma irradiation.

The graphitized carbon black filler having a reduced content of impurity metals can be obtained by heat-treating a starting carbon black filler at high temperature.

When a carbon black filler containing a very small amount of impurity metals is used, the obtained molded article is particularly excellent in property of metal-elution inhibition and is used suitably for wet process. In that case, there is no problem even if an average particle size is relatively large.

According to the present invention, the crosslinkable elastomer composition obtained by adding the above-mentioned specific carbon black filler to a fluorine-containing elastomer component or a silicone elastomer component can give a sealing member having excellent mechanical and chemical properties. Further the sealing member is treated by a special cleaning process disclosed in the above-mentioned WO99/49997, namely a process for cleaning with ultrapure water, a process for cleaning with a clean organic compound in the form of liquid at a cleaning temperature or with a clean inorganic aqueous solution, a dry etching cleaning process or an extractive cleaning process, and thus a molded article for semiconductor manufacturing equipment which has a very high cleanliness and has an excellent plasma resistance and an excellent property of metal-elution inhibition can be obtained.

BEST MODE FOR CARRYING OUT THE INVENTION

The carbon black filler to be used in the present invention is a carbon black filler having an impurity metal content measured by an ashing analysis method of not more than 300 ppm and an average particle size of not more than 700 μm.

As the carbon black filler, there are a graphitized carbon black filler having a relatively small particle size and suitable for a dry process requiring plasma resistance and a carbon black filler having a low content of impurity metals (not more than 100 ppm) and suitable for a wet process requiring metal-elution inhibition property.

Among them, examples of the graphitized carbon black are, for instance, TOCABLACK #3885, #3855, #3845 and #3800 available from Tokai Carbon Kabushiki Kaisha, and the like. Particularly preferred is a carbon black having a specific surface area of not less than 3 $m^2/g$ and DBP oil absorption of not less than 15 ml/100 g from the viewpoint of processability.

The graphitized carbon black to be used in the present invention is one having a relatively small average particle size, preferably from 10 to 100 μm, further preferably from 10 to 30 μm. Reduction of the impurity metal content is attained by heat-treating a starting carbon black at high temperature. The average particle size means an arithmetic mean value obtained by observing carbon black fillers dispersed on a circuit board at a magnification of ×10,000 to ×200,000 with an electron microscope and measuring a particle size of 100 fillers selected at random.

Impurity metals which become a problem because the amounts thereof are particularly large are, for example, alkali metals such as Na, K and Li; alkaline earth metals such as Ca, Mg and Ba; Fe, Cu, Cr, Ni, Al, and the like.

The clean graphitized carbon black filler of the present invention is added to a crosslinkable elastomer to give a crosslinkable elastomer composition. An adding amount of the filler is from 1 to 150 parts by weight (hereinafter referred to as "part"), preferably from 1 to 60 parts on the basis of 100 parts of the elastomer component. If the filler is added more, an amount of the filler to be falling away increases, which causes generation of particles.

On the other hand, as the carbon black filler having an impurity metal content of not more than 100 ppm, there can be used a carbon black having a relatively large average particle size of as large as 500 to 700 μm, for example, a high purity MT carbon black (Ultra-Pure N-990 available from Cancarb, Co., Ltd.) or a high purity carbon black obtained by cleaning a carbon black of usual grade (for example N-990 available from Cancarb, Co., Ltd., and the like). Though it is preferable that the impurity metal content is lower, preferred more is a content of not more than 30 ppm, more preferably not more than 10 ppm.

The above-mentioned clean carbon black filler of the present invention is added to a crosslinkable elastomer to give a crosslinkable elastomer composition. An adding amount of the filler is from 1 to 150 parts, preferably from 1 to 80 parts on the basis of 100 parts of the crosslinkable elastomer component. If the filler is added more, an amount of the filler to be falling away increases, which causes generation of particles.

The crosslinkable elastomer component is not limited particularly. When used as a starting material for a sealing member for semiconductor manufacturing equipment, a fluorine-containing elastomer or silicone elastomer is preferred.

Fluorine-containing elastomers which can be used preferably are those capable of being crosslinked with a peroxide crosslinking agent, or an imidazole, oxazole, thiazole or triazine crosslinking agent.

Examples of the fluorine-containing elastomer capable of being crosslinked with a peroxide crosslinking agent are as follows. Perfluoro elastomer comprising 40 to 90% by mole of tetrafluoroethylene, 10 to 60% by mole of perfluoro(vinyl ether) represented by the formula (1):

$$CF_2=CF-OR_f$$

wherein $R_f$ is a perfluoroalkyl group having 1 to 5 carbon atoms or a perfluoroalkyl(poly)ether group having 3 to 12 carbon atoms and 1 to 3 oxygen atoms, and 0 to 5% by mole of a monomer giving a cure site. Vinylidene fluoride elastomer comprising 30 to 90% by mole of vinylidene fluoride, 15 to 40% by mole of hexafluoropropylene and 0 to 30% by mole of tetrafluoroethylene.

Thermoplastic perfluoro elastomer which is a fluorine-containing multi-segment polymer comprising an elastomeric fluorine-containing polymer chain segment and a non-elastomeric fluorine-containing polymer chain segment, in which the elastomeric fluorine-containing polymer chain segment comprises 40 to 90% by mole of tetrafluoroethylene, 10 to 60% by mole of perfluoro(vinyl ether) represented by the formula (1):

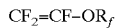

$$CF_2=CF-OR_f$$

wherein $R_f$ is a perfluoroalkyl group having 1 to 5 carbon atoms or a perfluoroalkyl(poly)ether group having 3 to 12 carbon atoms and 1 to 3 oxygen atoms, and 0 to 5% by mole of a monomer giving a cure site, and the non-elastomeric fluorine-containing polymer chain segment comprises 85 to 100% by mole of tetrafluoroethylene and 0 to 15% by mole of a compound represented by the formula (2):

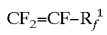

$$CF_2=CF-R_f^1$$

wherein $R_f^1$ is $CF_3$ or $OR_f^2$, in which $R_f^2$ is a perfluoroalkyl group having 1 to 5 carbon atoms.

Fluorine-containing multi-segment polymer comprising an elastomeric fluorine-containing polymer chain segment and a non-elastomeric fluorine-containing polymer chain segment, in which the elastomeric fluorine-containing polymer chain segment contains recurring units derived from 45 to 85% by mole of vinylidene fluoride and from at least one other monomer copolymerizable with vinylidene fluoride, respectively. Examples of the other monomer are hexafluoropropylene, tetrafluoroethylene, chlorotrifluoroethylene, trifluoroethylene, trifluoropropylene, tetrafluoropropylene, pentafluoropropylene, trifluorobutene, tetrafluoroisobutene, perfluoro(alkyl vinyl ether), vinyl fluoride, ethylene, propylene, alkylvinylether, and the like.

Cold resistant fluorine-containing elastomer prepared by radical polymerization in the presence of a di-iodine compound and comprising 0.005 to 1.5% by mole of iodine-containing fluorinated vinyl ether unit, 40 to 90% by mole of vinylidene fluoride unit and 3 to 35% by mole of perfluoro(methyl vinyl ether) unit (as case demand, hexafluoropropylene unit up to 25% by mole and/or tetrafluoroethylene unit up to 40% by mole may be contained) (JP-A-8-15753).

Copolymer of tetrafluoroethylene and propylene (U.S. Pat. No. 3,467,635), and the like.

As the peroxide to be used as a crosslinking agent in such peroxide crosslinking, those which have been used so far can be used. It is a matter of course that the peroxide which does not contain metal elements is preferred. Examples of the peroxide are 2,2-dimethyl-2,5-di(t-butylperoxy)hexane, and the like. As the crosslinking agent, for example, triallylisocyanurate may be used.

Fluorine-containing elastomers which are capable of being crosslinked with an imidazole, oxazole or thiazole crosslinking agent can provide an obtained molded article with very high heat resistance. Examples thereof are fluorine-containing elastomers containing a trafluoroethylene unit and the perfluoro(vinyl ether) unit represented by the above-mentioned formula (1) and having nitrile, carboxyl and/or alkoxycarbonyl as a crosslinkable group.

Examples of perfluoro(vinyl ether) are perfluoro(methyl vinyl ether) (PMVE), perfluoro(ethyl vinyl ether) (PEVE), perfluoro(propyl vinyl either) (PPVE), and the like. Among them, PMVE is preferred.

A proportion of the tetrafluoroethylene unit to the perfluoro(vinyl ether) unit is 40 to 90/60 to 10 in % by mole.

Examples of the crosslinkable group which gives reactivity for crosslinking to the fluorine-containing elastomer capable of being crosslinked with an imidazole, oxazole or thiazole crosslinking agent are nitrile, carboxyl and/or alkoxycarbonyl. Examples of alkoxycarbonyl are, for instance, methoxycarbonyl, ethoxycarbonyl, propoxycarbonyl, and the like. A content of the crosslinkable group is not more than 5% by mole, preferably not more than 2% by mole.

Examples of the method to introduce such a crosslinkable group are a method of copolymerizing a monomer having a crosslinkable group or a group convertible to a crosslinkable group (copolymerizing method), a method of converting a polymerization initiating moiety of polymer end to carboxyl (end group converting method), and the like.

Examples of the monomer to be used for the copolymerizing method are a nitrile-containing monomer, carboxyl-containing monomer, alkoxycarbonyl-containing monomer, and the like represented by:

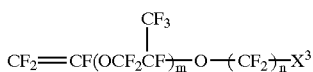

wherein m is 0 to 5 and n is 1 to 8,

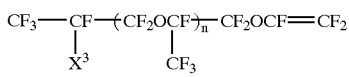

wherein n is 1 to 4,

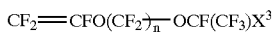

wherein n is 2 to 5,

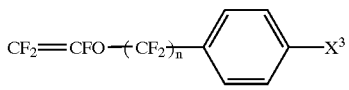

wherein n is 1 to 6,

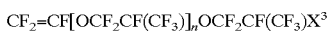

wherein n is 1 or 2, and

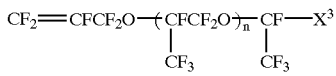

wherein $X^3$ is CN, COOH or $COOR^5$, in which $R^5$ is alkyl which may contain fluorine atom having 1 to 10 carbon atoms.

In case where at least one of end groups is carboxyl or alkoxycarbonyl, it is preferable to copolymerize a monomer having nitrile or, carboxyl from the viewpoint of crosslinking reactivity.

As a crosslinking agent to be used for the imidazole crosslinking, oxazole crosslinking or thiazole crosslinking, it is preferable to use a compound having at least two amino groups. Particularly from the viewpoint of enhancing heat resistance, preferred is a compound having at least two functional groups represented by the formula (I):

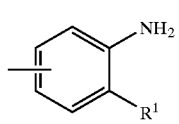

wherein $R^1$ is any one of OH, $NH_2$ or SH.

Examples of the compound represented by the formula (I) are those represented by the formula (II):

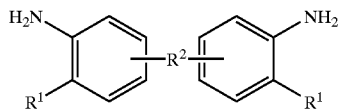

wherein $R^1$ is as defined above, $R^2$ is $-S_2-$, $-O-$, $-CO-$, alkylene having 1 to 6 carbon atoms, perfluoroalkylene having 1 to 10 carbon atoms, a single bond or a group represented by the formula (III).

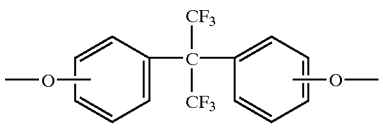

Positions of $NH_2$ and $R^1$ to phenyl group may be the same or different in both functional groups (I) at the right and left sides.

Non-restricted examples of preferred alkylene of $R^2$ which may be substituted are, for instance, non-substituted alkylene having 1 to 6 carbon atoms, perfluoroalkylene having 1 to 10 carbon atoms, and the like. Examples of perfluoroalkylene are:

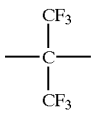

and the like. Those $R^2$ are known as a bisdiaminophenyl compound in JP-B-2-59177 and JP-A-8-120146.

Though $R^2$ may be bonded to any positions of the both right and left benzene rings, it is preferable that either of $NH_2$ group or $R^1$ is so bonded as to be at a para position from the viewpoint of easy synthesis and advancing a crosslinking reaction easily.

A Non-restricted examples of the crosslinking agent are, for instance, bisdiaminophenyl compound (for imidazole crosslinking) such as 2,2-bis-(3,4-diaminophenyl) hexafluoropropane, bis-(3,4-diaminophenyl)methane and bis-(3,4-diaminophenyl)ether; bisaminophenol compounds (for oxazole crosslinking) such as 2,2-bis-(3-amino-4-hydroxyphenyl)hexafluoropropane (generally called bis (aminophenol)AF); bisaminothiophenol compound (for thiazole crosslinking) such as 2,2-bis-(3-amino-4-mercaptophenyl)hexafluoropropane; and the like.

Those crosslinking agents give molded articles excellent in mechanical strength, heat resistance and chemical resistance, particularly having well-balanced heat resistance and chemical resistance.

Examples of the preferred silicone elastomer are, for instance, a silicone rubber, fluoro silicone rubber, and the like.

The elastomer composition can be crosslinked into products having desired forms. As a crosslinking method, though the above-mentioned peroxide crosslinking, imidazole crosslinking, oxazole crosslinking and thiazole crosslinking are preferable, other known crosslinking methods, for example, methods of triazine crosslinking, polyol crosslinking and polyamine crosslinking, methods of crosslinking by irradiating radioactive rays and electron beams, and the like may be employed.

An adding amount of the crosslinking agent is from 0.05 to 10 parts, preferably from 0.1 to 2.0 parts on the basis of 100 parts of the elastomer component and as case demands, the crosslinking accelerator is added in an amount of from 0.1 to 10 parts, preferably from 0.3 to 5.0 parts on the basis of 100 parts of the elastomer component. In addition, a processing aid, internal mold releasing agent, and the like may be added in an amount not lowering effect of the present invention.

The crosslinkable elastomer composition of the present invention can be suitably used for production of a molded article, particularly a molded article such as a sealing member for sealing of a semiconductor manufacturing equipment which is particularly required to be highly clean. Examples of the sealing member are O-ring, square ring, gasket, packing, oil seal, bearing seal, lip type seal, and the like.

In addition, the crosslinkable elastomer composition can be used for a variety of elastomer products, for example, diaphragm, tube, hose, various rubber rolls, and the like. Also the composition can be used as a coating material and a lining material.

The molded article of the present invention is suitable for a sealing member for sealing of a semiconductor manufacturing equipment which is used for a dry process such as a plasma etching equipment mentioned hereinafter and also a sealing member for sealing of a semiconductor manufacturing equipment, for example, a cleaning equipment to be used for a wet process since elution of metals can be reduced.

A molded article suitable for a dry process is one having an impurity metal content measured by an ashing analysis method of not more than 100 ppm and an increasing rate of particles generated by irradiating oxygen plasma of not more than 500%, preferably not more than 200%. Also an increasing rate of particles generated by irradiating $CF_4$ plasma is not more than 700%, preferably not more than 500%. It is preferable that the number of particles increased by irradiating oxygen plasma is not more than $50 \times 10^4/cm^2$.

It is preferable that a change in weight of the molded article after the irradiation of oxygen plasma is not more than 0.90% by weight, and a change in weight of the molded article after the irradiation of $CF_4$ plasma is not more than 0.330% by weight.

A molded article suitable for a wet process is one having an impurity metal content measured by an ashing analysis method of not more than 100 ppm, preferably not more than 50 ppm. An amount of impurity metal extracted with $H_2SO_4/H_2O_2$ (4/1 in weight ratio) is not more than 100 ppb, preferably not more than 70 ppb, and an amount of impurity metal extracted with a 50% by weight aqueous solution of HF is not more than 500 ppb, preferably not more than 400 ppb.

In the present invention, the semiconductor manufacturing equipment is not limited particularly to equipment for manufacturing semiconductors and encompasses whole manufacturing equipment used widely in the field of semiconductors where a high degree of cleanliness is required, such as equipment for manufacturing a liquid crystal panel and plasma panel.

Examples of the semiconductor manufacturing equipment are as follows.
(1) Etching system
  Dry etching equipment (for dry etching)
    Plasma etching machine (for dry etching)
    Reactive ion etching machine (for dry etching)
    Reactive ion beam etching machine (for dry etching)
    Sputter etching machine (for dry etching)
    Ion beam etching machine (for dry etching)
  Wet etching equipment (for wet etching)
  Ashing equipment (for dry etching)
(2) Cleaning system
  Dry etching cleaning equipment (for dry etching)
    $UV/O_3$ cleaning machine (for dry etching)
    Ion beam cleaning machine (for dry etching)
    Laser beam cleaning machine (for dry etching)
    Plasma cleaning machine (for dry etching)
    Gas etching cleaning machine (for dry etching)
  Extractive cleaning equipment
    Soxhlet extractive cleaning machine (for wet etching)
    High temperature high pressure extractive cleaning machine (for wet etching)
    Microwave extractive cleaning machine (for wet etching)
    Supercritical extractive cleaning machine (for wet etching)
(3) Exposing system
  Stepper (for wet etching)
  Coater and developer (for wet etching)
(4) Polishing system
  CMP equipment (for wet etching)
(5) Film forming system
  CVD equipment (for dry etching)
  Sputtering equipment (for dry etching)
(6) Diffusion and ion implantation system
  Oxidation and diffusion equipment (for dry etching)
  Ion implantation equipment (for dry etching)
(7) Cleaning system using hydrofluoric acid, hydrochloric acid, sulfuric acid, aqueous ozone, and the like (for wet process)

The present invention is then explained by means of examples, but is not limited to them.

Impurity metal contents of the carbon black fillers used in the following examples and comparative examples are measured by an ashing analysis method and are shown in Table 1.

(Content of Impurity Metals in Filler)

0.5 To 2.0 g of a carbon black filler is put in a clean platinum crucible, and heated at 600° C. for two hours to carry out ashing sufficiently. To the ash left in the crucible is added 5 ml of hydrochloric acid, followed by dissolving by heating in a hot bath and then diluting with ultrapure water. Contents of metals of that solution are determined through atomic absorption analysis by using an atomic absorption photometer (Z8000 available from Hitachi, Ltd.). Metals to be detected are shown in Table 1. The contents of each metal in the filler are obtained by the following equation.

$$\text{Metal content (ppm)} = \frac{\text{Concentration in solution (ppm)}}{\text{Weight of filler (g)}} \times \text{Weight of solution (g)}$$

EXAMPLE 1

A 6-liter stainless steel autoclave provided with no ignition source was charged with 2 liters of pure water, 20 g of $C_7F_{15}COONH_4$ as an emulsifying agent and 0.18 g of disodium hydrogen phosphate.$12H_2O$ as a pH regulator. After the inside of the system was replaced with nitrogen gas sufficiently for deaeration, the autoclave was heated to 50° C. width stirring at 600 rpm, and a mixed gas of tetrafluoroethylene (TFE) and perfluoro(methyl vinyl ether) (PMVE) (TFE/PMVE=20/80 in mole ratio) was fed so that the inside pressure became 1.18 MPa.G. Then 2 ml of an aqueous solution containing ammonium persulfate (APS) in a concentration of 186 mg/ml was fed with pressurized nitrogen to initiate a reaction.

With advance of the polymerization, at the time when the inside pressure lowered to 1.08 MPa.G, 4.0 g of di-iodine compound $I(CF_2)_4I$ was fed with pressurized nitrogen. Then a mixed gas of TFE and PMVE (mole ratio of 19/23) was fed under pressure by a plunger pump. After that, increasing and decreasing of the pressure were repeated between 1.08 MPa.G and 1.18 MPa.G.

At the time when a total feeding amount of TFE and PMVE reached 430 g, 511 g and 596 g, respectively, 1.5 g of $ICH_2CF_2CF_2OCF=CF_2$ was fed under pressure. Also every 12 hours after the initiation of the polymerization reaction, 2 ml of an aqueous solution containing APS in a concentration of 35 mg/ml was fed with pressurized nitrogen to continue the polymerization reaction. The polymerization was terminated 35 hours after the initiation of the reaction.

The obtained aqueous emulsion was frozen in dry ice/methanol to be coagulated, and then after thawing, a precipitated product was washed with water and vacuum-dried to give an elastomeric copolymer. A Mooney viscosity $ML_{1+10}$ (100° C.) of the copolymer was 63.

As a result of $^{19}F$-NMR analysis, monomer units of the copolymer were TFE/PMVE=59.2/40.8 in % by mole, and an iodine content obtained by elementary analysis was 0.03% by weight.

An elastomer composition of the present invention was prepared by kneading 10 g of a graphitized carbon black filler (TOCABLACK #3885 available from Tokai Carbon Kabushiki Kaisha and containing impurity metals shown in Table 1, specific surface area: 160 m²/g, DBP oil absorption: 75 ml/ 100 g, average particle size: 15 μm), 0.5 g of 2,5-dimethyl-2,5-di(t-butylperoxy)hexane (Perhexa 2.5B available from NOF Corporation) and 2.0 g of triallylisocyanurate (TAIC) (available from Nippon Kasei Kabushiki Kaisha) with 100 g of the obtained tetrafluoroethylene/perfluoro(alkyl vinyl ether) copolymer elastomer. The composition was crosslinked with a hot press (primary crosslinking) by compression-molding at 160° C. for 10 minutes, and then crosslinked in an oven (secondary crosslinking) at 180° C. for four hours to give an O-ring (AS-568A-214).

The obtained O-ring was cleaned with sufficiently much amount of $H_2SO_4/H_2O_2$ (4/1 in weight ratio) mixture solution at 100° C. for 30 minutes with stirring and after rinsing with pure water, was dried under clean environment to give a sample O-ring.

With respect to the obtained O-ring, the number of particles was measure d by the method mentioned below.

(Number of Particles)

The sample was cleaned with a supersonic wave in ultrapure water at 25° C. for one hour, and then the number of particles having a particle size of not less than 0.2 μm was measured by a fine particle meter method (a method of emitting light to ultrapure water containing particles which was flowed into a sensor part and then electrically measuring amounts of transmitted light and scattered light with a submerged particle counter (available from Kabushiki Kaisha Rion)) by using the following calculation.

$$\text{Number of particles released from O-ring } (/cm^2) = \frac{\left(\frac{\text{Total amount of ultrapure water (ml)}}{\text{Amount of pure water sampled in particle counter}}\right) \times \left(\begin{array}{c}\text{Number of}\\\text{particles per}\\\text{one O-ring}\end{array}\right)}{\text{Surface area per one O-ring (AS-568A-214) }(cm^2)}$$

Subsequently plasma resistance test of the above-mentioned cleaned O-ring was carried out by the method mentioned below and the number of particles after plasma irradiation to the O-ring was measured in the same manner as above. The results are shown in Table 2 together with a n increasing rate of particles and a change in weight after the plasma irradiation.

(Plasma Resistance Test)

Plasma was generated under the conditions of a vacuum pressure of 50 mTorr, an oxygen flow or $CF_4$ flow of 200 cc/min, electric power of 400 W and a frequency of 13.56 MHz by using Plasma Dry Cleaner Model PX-1000 available from Kabushiki Kaisha Samco International Kenkyusho, and the generated plasma was irradiated to a sample (O-ring) under the reactive ion etching (RIE) conditions for three hours.

Further amounts of extracted metals of the obtained O-ring were determined by the method mentioned below. The results are shown in Table 3 (extraction in $H_2SO_4/H_2O_2$ (4/1 in weight ratio)) and Table 4 (extraction in 50% HF).

(Metal Extraction Test)

(1) A vessel (with a lid) made of tetrafluoroethylene-perfluoro(alkyl vinyl ether) copolymer (so-called PFA) and sufficiently cleaned previously is charged with a given amount of chemical solution for extraction.

(2) The chemical solutions to be used for extraction are $H_2SO_4/H_2O_2$ (4/1) mixture and a 50% by weight aqueous solution of HF. Both chemical solutions to be used are those having a grade for use in production of semiconductors.

(3) The obtained O-ring was cleaned with sufficiently much amount of $H_2SO_4/H_2O_2$ (4/1 in weight ratio) mixture solution at 100° C. for 30 minutes with stirring and after rinsing with pure water, was dried under clean environment to give a sample O-ring. The sample O-rings are dipped in the respective chemical solutions, and after sealing, both solutions are kept at a given temperature (at 25° C. for 14 days in case of $H_2SO_4/H_2O_2$ (4/1) mixture and 25° C. for 24 hours in case of a 50% by weight aqueous solution of HF). In that case, those solutions are compared with control solutions stored without dipping the samples therein.

(4) After storing the solutions for the above-mentioned period of time, concentrations of metals contained in the solutions were measured with ICP-MS (SPQ9000 available from Seiko Denshi Kabushiki Kaisha) in case of $H_2SO_4/H_2O_2$ (4/1) mixture and with an atomic absorption photometer (Z8000 available from Hitachi, Ltd.) in case of a 50% by weight aqueous solution of HF.

(5) Amounts of impurity metals extracted from the O-ring were calculated by the following equation.

$$\text{Amount of extracted metal (ppb)} = \frac{\begin{pmatrix} \text{Metal} \\ \text{concentration} \\ \text{in chemical} \\ \text{solution} \\ \text{(ppb)} \end{pmatrix} \times \begin{pmatrix} \text{Metal} \\ \text{concentration} \\ \text{in control} \\ \text{solution} \\ \text{(ppb)} \end{pmatrix}}{\text{Weight of O-ring (g)}} \times \text{Weight of chemical solution (g)}$$

Further impurity metal contents of the obtained O-ring were determined by the above-mentioned ashing analysis method (method of determining content of impurity metals in filler). The results are shown in Table 5.

Comparative Example 1

An elastomer composition for comparison was prepared by kneading in the same manner as in Example 1 except that a general-purpose carbon black filler (MT Carbon (Medium Thermal Furnace Black), Termax N-990 available from Cancarb Co., Ltd. and containing impurity metals shown in Table 1, specific surface area: 6 m²/g, DBP oil absorption: 50 ml/ 100 g, average particle size: 500 μm, pH: 10.0) was used instead of the graphitized carbon black filler in the same amount as the graphitized carbon black filler. The composition was crosslinked in the same manner as in Example 1 to give an O-ring, and the number of particles before and after plasma resistance test and a change in weight after the plasma irradiation were determined. The results are shown in Table 2.

Also amounts of extracted impurity metals of the O-ring were measured in the same manner as in Example 1. The results are shown in Table 3 (extraction in $H_2SO_4/H_2O_2$ (4/1)) and Table 4 (extraction in 50% by weight HF).

Further impurity metal contents of the obtained O-ring were determined by the above-mentioned ashing analysis method in the same manner as in Example 1. The results are shown in Table 5.

EXAMPLE 2

A 3-liter stainless steel autoclave provided with no ignition source was charged with 1 liter of pure water, 10 g of:

$C_3F_7OCFCF_2OCFCOONH_4$ with $CF_3$ groups as an emulsifying agent and 0.09 g of disodium hydrogen phosphate·12$H_2O$ as a pH regulator. After the inside of the system was replaced with nitrogen gas sufficiently for deaeration, the autoclave was heated to 50° C. with stirring at 600 rpm, and a mixed gas of tetrafluoroethylene (TFE) and perfluoro(methyl vinyl ether) (PMVE) (TFE/PMVE= 25/75 in mole ratio) was fed so that the inside pressure became 0.78 MPa.G. Then 10 ml of an aqueous solution containing ammonium persulfate (APS) in a concentration of 527 mg/ml was fed with pressurized nitrogen to initiate a reaction.

With advance of the polymerization, at the time when the inside pressure lowered to 0.69 MPa.G, 1.89 g of $CF_2$=$CFOCF_2CF(CF_3)OCF_2CF_2COOH$ (CBVE) was fed with pressurized nitrogen. Then 4.7 g of TFE and 5.3 g of PMVE were fed with their self-pressures so that the inside pressure became 0.78 MPa.G. After that, with the advance of the reaction, TFE and PMVE were fed under pressure in the same manner, and increasing and decreasing of the pressure were repeated between 0.78 MPa.G and 0.69 MPa.G. At the time when a total feeding amount of TFE and PMVE reached 80 g 4.2 hours after the initiation of the polymerization reaction, the autoclave was cooled and an un-reacted monomer was released to give 1,089 g of an aqueous dispersion having a solid content of 7.5% by weight.

Then 1,000 g of the aqueous dispersion was diluted with 3,000 g of water and slowly added to 2,800 g of aqueous solution of 3.5% by weight of hydrochloric acid with stirring. After the addition, the solution was stirred and a precipitated product was filtrated. The obtained polymer was further added to 800 g of HCFC-141b, stirred for five minutes and then filtrated. After that, the steps of washing with HCFC-141b and filtrating were repeated four times, followed by vacuum-drying at 120° C. for 72 hours to give an elastomeric copolymer.

As a result of $^{19}$F-NMR analysis, monomer units of the coqpolymer were TFE/PMVE/CBVE=59.6/39.9/0.5 in % by mole.

An elastomer composition of the present invention was prepared by kneading 10 g of a graphitized carbon black filler (TOCABLACK #3885) and 2.0 g of 2,2-bis(3,4-diaminophenyl)hexafluoropropane with 100 g of the obtained tetrafluoroethylene/perfluoro(alkyl vinyl ether) copolymer elastomer. The composition was crosslinked with a hot press (primary crosslinking) by compression-molding at 200° C. for 30 minutes, followed by crosslinking in an oven (secondary crosslinking) at 204° C. for 18 hours and then at 288° C. for 18 hours to give an O-ring (AS-568A-214).

With respect to the obtained O-ring, the number of particles before and after plasma resistance test and a change in weight after the plasma irradiation were determined in the same manner as in Example 1. The results are shown in Table 2.

Also amounts of extracted impurity metals of the O-ring were measured in the same manner as in Example 1. The results are shown in Table 3. (extraction in $H_2SO_4/H_2O_2$ (4/1)) and Table 4 (extraction in 50% by weight HF).

Further impurity metal contents of the obtained O-ring were determined by the above-mentioned ashing analysis method in the same manner as in Example 1. The results are shown in Table 5.

Comparative Example 2

An elastomer composition for comparison was prepared by kneading in the same manner as in Example 2 except that a general-purpose carbon black filler (MT Carbon, Termax N-990) was used instead of the graphitized carbon black filler in the same amount as the graphitized carbon black filler. The composition was crosslinked in the same manner as in Example 2 to give an O-ring, and the number of particles before and after plasma resistance test and a change in weight after the plasma irradiation were determined. The results are shown in Table 2.

Also amounts of extracted impurity metals of the O-ring were measured in the same manner as in Example 1. The results are shown in Table 3 (extraction in $H_2SO_4/H_2O_2$ (4/1)) and Table 4 (extraction in 50% by weight HF).

Further impurity metal contents of the obtained O-ring were determined by the above-mentioned ashing analysis method in the same manner as in Example 2. The results are shown in Table 5.

EXAMPLE 3

A crosslinkable elastomer composition was prepared in the same manner as in Example 1 except that a high purity MT carbon black (Ultra-Pure N-990 available from Cancarb Co., Ltd. and containing impurity metals shown in Table 1) was used as a carbon black filler. The composition was crosslinked in the same manner as in Example 1 to give an O-ring (AS-568A-214). With respect to the obtained O-ring, the number of particles before and after plasma resistance test and a change in weight after the plasma irradiation were determined. The results are shown in Table 2.

Also amounts of extracted impurity metals of the O-ring were measured in the same manner as in Example 1. The results are shown in Table 3 (extraction in $H_2SO_4/H_2O_2$ (4/1)) and Table 4 (extraction in 50% by weight HF).

Further impurity metal contents of the obtained O-ring were determined by the above-mentioned ashing analysis method in the same manner as in Example 1. The results are shown in Table 5.

EXAMPLE 4

A crosslinkable elastomer composition was prepared in the same manner as in Example 2 except that a high purity MT carbon black (Ultra-pure N-990 available from Cancarb Co., Ltd. and containing metals shown in Table 1) was used as a carbon black filler. The composition was crosslinked in the same manner as in Example 2 to give an O-ring (AS-568A-214). With respect to the obtained O-ring, the number of particles before and after plasma resistance test and a change in weight after the plasma irradiation were determined. The results are shown in Table 2.

Also amounts of extracted impurity metals of the O-ring were measured in the same manner as in Example 1. The results are shown in Table 3 (extraction in $H_2SO_4/H_2O_2$ (4/1)) and Table 4 (extraction in 50% by weight HF).

Further impurity metal contents of the obtained O-ring were determined by the above-mentioned ashing analysis method in the same manner as in Example 2. The results are shown in Table 5.

EXAMPLE 5

100 Grams of a carbon black (MT carbon Termax N-990) used in Comparative Example 1 was dispersed in 300 ml of sulfuric acid having a concentration of 15% by weight, followed by stirring at room temperature for three hours for acid treatment and filtrating with a polytetrafluoroethylene filter. Then after cleaning with 2,000 ml of ultrapure water, the treated product (pH: 3.8) was dispersed in 300 ml of a 10% by weight of aqueous ammonia to be subjected to neutralizing at room temperature for three hours with stirring. After cleaned with 2,000 ml of ultrapure water, the obtained product was filtrated with a polytetrafluoroethylene filter, and pre-dried at 120° C. for ten hours in a clean dryer, followed by further drying at 250° C. for five hours to give a cleaned carbon black filler. A pH value and impurity metal contents of the obtained filler were determined. The pH value was 6.0 and as shown in Table 1, the impurity metal contents had been reduced. The pH value was determined by the method mentioned below. (pH)

3 Grams of carbon black filler was dispersed in 30 ml of ultrapure water and stirring was carried out at room temperature for one hour with a magnetic stirrer. Then the pH value of the ultrapure water was measured with a pH meter.

A crosslinkable elastomer composition was prepared in the same manner as in Example 1 except that the cleaned carbon black filler was used, and then crosslinked to give an O-ring (AS-568A-214). With respect to the obtained O-ring, the number of particles before and after plasma resistance test and a change in weight after the plasma irradiation were determined. The results are shown in Table 2.

Also amounts of extracted impurity metals of the O-ring were measured in the same manner as in Example 1. The results are shown in Table 3 (extraction in $H_2SO_4/H_2O_2$ (4/1)) and Table 4 (extraction in 50% by weight HF).

Further impurity metal contents of the obtained O-ring were determined by the above-mentioned ashing analysis method in the same manner as in Example 1. The results are shown in Table 5.

EXAMPLE 6

A crosslinkable elastomer composition was prepared in the same manner as in Example 2 except that a cleaned MT carbon black obtained in Example 5 was used as the carbon black filler, and then the crosslinkable elastomer composition was crosslinked to give an O-ring (AS-568A-214). With respect to the obtained O-ring, the number of particles before and after plasma resistance test and a change in weight after the plasma irradiation were determined. The results are shown in Table 2.

Also amounts of extracted impurity metals of the O-ring were measured in the same manner as in Example 1. The results are shown in Table 3 (extraction in $H_2SO_4/H_2O_2$ (4/1)) and Table 4 (extraction in at 50% by weight HF).

Further impurity metal contents of the obtained O-ring were determined by the above-mentioned ashing analysis method in the same manner as in Example 2. The results are shown in Table 5.

TABLE 1

| | Content (ppm) | | | | |
|---|---|---|---|---|---|
| Impurity metal | Graphitized carbon Ex. 1 and Ex. 2 | High purity MT carbon Ex. 3 and Ex. 4 | Cleaned MT carbon Ex. 5 and Ex. 6 | MT carbon Com. Ex. 1 and Com. Ex. 2 | Detection limit (ppm) |
| Na | 3 | 2 | 1 | 390 | 0.1 |
| K | 90 | 0.1 | 0.1 | 10 | 5 |
| Ca | 100 | 2 | 0.1 | 1 | 7 |
| Mg | 0.1 | 0.1 | 0.04 | 2 | 0.3 |
| Fe | 10 | 1 | 0.9 | 1 | 2 |
| Ni | 10 | 0.1 | 1 | 10 | 8 |
| Cu | 2 | 0.3 | 1 | 10 | 0.5 |
| Cr | 1 | 0.1 | 1 | 10 | 0.4 |
| Total | 216.1 | 5.7 | 5.14 | 434 | — |

TABLE 2

|  | Graphitized carbon | | High purity MT carbon | | Cleaned MT carbon | | MT carbon | |
|---|---|---|---|---|---|---|---|---|
|  | | | | | | | Com. | Com. |
|  | Ex. 1 | Ex. 2 | Ex. 3 | Ex. 4 | Ex. 5 | Ex. 6 | Ex. 1 | Ex. 2 |
| Oxygen plasma irradiation test Number of particles × $10^4/cm^2$) | | | | | | | | |
| Before plasma irradiation (A) | 1.1 | 0.9 | 1.2 | 1.1 | 0.9 | 1.0 | 1.1 | 1.2 |
| After plasma irradiation (B) | 2.3 | 2.0 | 7.7 | 7.3 | 6.7 | 6.7 | 7.3 | 7.3 |
| Number of increased particles (C = B − A) | 1.2 | 1.1 | 6.5 | 6.2 | 5.8 | 5.7 | 6.2 | 6.6 |
| Increasing rate (C/A × 100) (%) | 109 | 122 | 542 | 564 | 644 | 570 | 564 | 508 |
| Change in weight (% by weight) | 0.871 | 0.857 | 0.918 | 0.909 | 0.923 | 0.921 | 0.924 | 0.909 |
| $CF_4$ plasma irradiation test Number of particles × $10^4/cm^2$) | | | | | | | | |
| Before plasma irradiation (A) | 1.1 | 0.9 | 1.2 | 1.1 | 0.9 | 1.0 | 1.1 | 1.2 |
| After plasma irradiation (B) | 5.3 | 4.9 | 10.9 | 10.6 | 9.8 | 9.5 | 10.3 | 9.9 |
| Number of increased particles (C = B − A) | 4.2 | 4.0 | 9.7 | 9.5 | 8.9 | 8.5 | 9.2 | 8.7 |
| Increasing rate (C/A × 100) (%) | 382 | 444 | 808 | 864 | 989 | 850 | 836 | 725 |
| Change in weight (% by weight) | 0.324 | 0.311 | 0.352 | 0.348 | 0.338 | 0.333 | 0.349 | 0.335 |

TABLE 3

| Impurity metal | Extracted amount (ppb) | | | | | | | | Detection limit (ppb) |
|---|---|---|---|---|---|---|---|---|---|
|  | Graphitized carbon | | High purity MT carbon | | Cleaned MT carbon | | MT carbon | | |
|  | | | | | | | Com. | Com. | |
|  | Ex. 1 | Ex. 2 | Ex. 3 | Ex. 4 | Ex. 5 | Ex. 6 | Ex. 1 | Ex. 2 | |
| Na | 20 | 20 | 20 | 20 | 20 | 20 | 40 | 40 | 3 |
| K | ND | ND | ND | ND | ND | ND | ND | ND | 4 |
| Ca | 30 | 25 | 25 | 25 | 30 | 30 | 30 | 30 | 1 |
| Mg | 10 | 10 | 10 | 8 | 3 | 5 | 10 | 10 | 1 |
| Fe | 20 | 20 | 10 | 10 | 10 | 10 | 30 | 30 | 5 |
| Ni | ND | ND | ND | ND | ND | ND | ND | ND | 3 |
| Cu | ND | ND | ND | ND | ND | ND | 5 | 6 | 1 |
| Cr | ND | ND | ND | ND | ND | ND | ND | ND | 5 |
| Total | 80 | 75 | 65 | 63 | 63 | 65 | 115 | 116 | — |

TABLE 4

| Impurity metal | Extracted amount (ppb) | | | | | | | | Detection limit (ppb) |
|---|---|---|---|---|---|---|---|---|---|
|  | Graphitized carbon | | High purity MT carbon | | Cleaned MT carbon | | MT carbon | | |
|  | | | | | | | Com. | Com. | |
|  | Ex. 1 | Ex. 2 | Ex. 3 | Ex. 4 | Ex. 5 | Ex. 6 | Ex. 1 | Ex. 2 | |
| Na | 20 | 20 | 20 | 20 | 20 | 20 | 60 | 50 | 0.5 |
| K | 10 | 10 | 10 | 10 | 10 | 10 | 10 | 10 | 0.5 |
| Ca | 40 | 30 | 30 | 40 | 40 | 30 | 40 | 40 | 1 |
| Mg | 100 | 100 | 100 | 100 | 100 | 100 | 100 | 100 | 0.4 |
| Fe | 200 | 200 | 100 | 100 | 100 | 100 | 300 | 300 | 1 |
| Ni | 20 | 20 | 20 | 20 | 20 | 20 | 20 | 20 | 3 |
| Cu | 70 | 70 | 50 | 50 | 50 | 50 | 89 | 70 | 1 |
| Cr | 2 | 2 | 2 | 3 | 3 | 3 | 3 | 3 | 1 |
| Total | 462 | 452 | 332 | 343 | 343 | 333 | 622 | 593 | — |

TABLE 5

| Impurity metal | Content (ppm) | | | | | | | | Detection limit (ppm) |
|---|---|---|---|---|---|---|---|---|---|
|  | Graphitized carbon | | High purity MT carbon | | Cleaned MT carbon | | MT carbon | | |
|  | | | | | | | Com. | Com. | |
|  | Ex. 1 | Ex. 2 | Ex. 3 | Ex. 4 | Ex. 5 | Ex. 6 | Ex. 1 | Ex. 2 | |
| Na | 2 | 3 | 2 | 4 | 1 | 1 | 50 | 50 | 0.01 |
| K | 5 | 4 | 4 | 5 | 1 | 2 | 2 | 3 | 0.02 |
| Ca | 9 | 10 | 0.5 | 0.7 | 3 | 3 | 3 | 2 | 0.02 |
| Mg | 2 | 2 | 2 | 3 | 6 | 5 | 2 | 2 | 0.01 |
| Fe | 40 | 40 | 3 | 5 | 6 | 5 | 10 | 10 | 0.02 |
| Ni | 9 | 8 | 0.2 | 0.2 | 0.2 | 0.5 | 1 | 2 | 0.02 |
| Cu | 30 | 30 | 2 | 2 | 6 | 6 | 40 | 40 | 0.02 |
| Cr | 1 | 2 | 0.2 | 0.5 | 3 | 4 | 1 | 2 | 0.02 |
| Total | 98 | 99 | 13.9 | 20.4 | 26.2 | 26.5 | 109 | 111 | — |

Industrial Applicability

The crosslinkable elastomer composition prepared by using a graphitized carbon black filler or a carbon black filler having a sufficiently low content of impurity metals according to the present invention not only makes it possible to attain cleanliness required but also can provide a molded article for a semiconductor manufacturing equipment which is excellent in plasma resistance and has an excellent property of metal-elution inhibition.

Particularly a molded article obtained by crosslinking a composition containing a graphitized carbon black filler is excellent in plasma resistance, and therefore is suitable for a sealing member used for sealing of semiconductor manufacturing equipment for dry process. Also a molded article obtained by crosslinking a composition containing a carbon black filler having a sufficiently low content of impurity metals has an excellent property of metal-elution inhibition, and therefore is suitable for a sealing member used for sealing of semiconductor manufacturing equipment for wet process.

What is claimed is:

1. An elastomer molded article which is obtained by crosslinking a crosslinkable elastomer composition comprising a crosslinkable elastomer component and a carbon black filler having an average particle size of not more than 700 μm; said filler having an impurity metal content measured by an ashing analysis method of not more than 300 ppm; said molded article has an impurity metal content measured by an ashing analysis method of not more than 100 ppm and an increasing rate of particles generated by irradiating oxygen plasma to the article is not more than 500%.

2. The elastomer molded article of claim 1, wherein said carbon black filler is a graphitized carbon black filler.

3. The elastomer molded article of claim 1, wherein an average particle size of said carbon black filler is from 10 to 100 μm.

4. The elastomer molded article of claim 1, wherein said carbon black filler is blended in an amount of 1 to 150 parts by weight on the basis of 100 parts by weight of the crosslinkable elastomer component.

5. The elastomer molded article of claim 1, which contains a crosslinking agent and said carbon black filler in amounts of 0.05 to 10 parts by weight and 1 to 150 parts by weight, respectively on the basis of 100 parts by weight of the crosslinkable elastomer component.

6. The elastomer molded article of claim 1, wherein the crosslinkable elastomer component is a fluorine-containing elastomer or a silicone elastomer.

7. The elastomer molded article of claim 6 obtained by crosslinking the crosslinkable elastomer composition with a peroxide crosslinking agent, wherein the crosslinkable elastomer component is a fluorine-containing elastomer.

8. The elastomer molded article of claim 6 obtained by crosslinking the crosslinkable elastomer composition with an imidazole, oxazole, thiazole, or triazine crosslinking agent, wherein the crosslinkable elastomer component is a fluorine-containing elastomer.

9. The elastomer molded article of claim 6 obtained by crosslinking the crosslinkable elastomer composition with an organic peroxide.

10. The elastomer molded article of claim 6 obtained by crosslinking the crosslinkable elastomer composition with a compound having at least two functional groups represented by the formula (I):

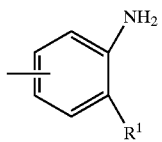

wherein $R^1$ is any one of OH, $NH_2$ or SH.

11. The elastomer molded article of claim 1, wherein the article is used for a semiconductor manufacturing equipment.

12. The elastomer molded article of claim 11, wherein the article is a sealing member used for sealing of semiconductor manufacturing equipment.

13. The elastomer molded article of claim 12, wherein the article is a sealing member used for sealing of semiconductor manufacturing equipment for dry process.

14. An elastomer molded article which is obtained by crosslinking a crosslinkable elastomer composition comprising a crosslinkable elastomer component and a carbon black filler having an average particle size of not more than 700 μm; said filler having an impurity metal content measured by an ashing analysis method of not more than 300 ppm; said molded article has an impurity metal content measured by an ashing analysis method of not more than 100 ppm and an amount of impurity metals extracted from the article with a 50% by weight aqueous solution of HF is not more than 500 ppb.

15. The elastomer molded article of claim 14, wherein the impurity metal content of the carbon black filler which is measured by an ashing analysis method is not more than 100 ppm.

16. The elastomer molded article of claim 14, wherein an average particle size of the carbon black filler is from 500 to 700 μm.

17. The elastomer molded article of claim 14, wherein said carbon black filler is blended in an amount of 1 to 150 parts by weight on the basis of 100 parts by weight of the crosslinkable elastomer component.

18. The elastomer molded article of claim 14, which contains a crosslinking agent and said carbon black filler in amounts of 0.05 to 10 parts by weight and 1 to 150 parts by weight, respectively on the basis of 100 parts by weight of the crosslinkable elastomer component.

19. The elastomer molded article of claim 14, wherein the crosslinkable elastomer component is a fluorine-containing elastomer or a silicone elastomer.

20. The elastomer molded article of claim 19, obtained by crosslinking the crosslinkable elastomer composition with a peroxide crosslinking agent, wherein the crosslinkable elastomer component is a fluorine-containing elastomer.

21. The elastomer molded article of claim 19, obtained by crosslinking the crosslinkable elastomer composition with an imidazole, oxazole, thiazole or triazine crosslinking agent, wherein the crosslinkable elastomer component is a flourine-containing elastomer.

22. The elastomer molded article of claim 19 obtained by crosslinking the crosslinkable elastomer composition with is an organic peroxide.

23. The elastomer molded article of claim 19 obtained by crosslinking the crosslinkable elastomer composition with is a compound having at least two functional groups represented by the formula (I):

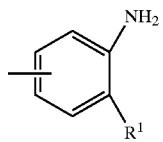

wherein $R^1$ is any one of OH, $NH_2$ or SH.

24. The elastomer molded article of claim 14, wherein the article is used for semiconductor manufacturing equipment.

25. The elastomer molded article of claim 24, wherein the article is a sealing member used for sealing of semiconductor manufacturing equipment.

26. The elastomer molded article of claim 25, wherein the article is a sealing member used for sealing of semiconductor manufacturing equipment for wet process.

27. The elastomer molded article of claim 26, wherein the article is a sealing member used for sealing of semiconductor manufacturing equipment for wet process with ultrapure water.

* * * * *